United States Patent
Riddle

(10) Patent No.: US 6,299,964 B1
(45) Date of Patent: Oct. 9, 2001

(54) FLEXIBLE COMPOSITE CURE FIXTURE

(75) Inventor: Dennis C. Riddle, Walnut, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/144,547

(22) Filed: Sep. 1, 1998

(51) Int. Cl.[7] .................................................. B30B 11/02
(52) U.S. Cl. .................... 428/119; 425/403; 425/468; 249/155; 249/156; 249/175
(58) Field of Search .................... 249/175, 156, 249/102, 155; 425/403, 470, 468; 428/119

(56) References Cited

U.S. PATENT DOCUMENTS

| | | | |
|---|---|---|---|
| 2,900,663 | * 8/1959 | Linhorst | 18/5 |
| 3,380,121 | 4/1968 | Chittenden et al. | 18/35 |
| 3,568,487 | * 3/1971 | Riesener | 72/60 |
| 3,705,512 | * 12/1972 | Koschatzky | 72/57 |
| 3,832,100 | * 8/1974 | Baxendale | 425/78 |
| 3,861,640 | 1/1975 | Agneta | 249/102 |
| 4,111,623 | * 9/1978 | Black | 425/129 R |
| 4,330,248 | 5/1982 | Platte | 425/183 |
| 4,551,084 | 11/1985 | Lake | 425/185 |
| 4,564,352 | * 1/1986 | Pettersson | 425/405 H |
| 4,695,032 | 9/1987 | Desport | 249/112 |
| 4,705,471 | 11/1987 | Shah et al. | 425/195 |
| 4,934,919 | * 6/1990 | Matsushita et al. | 425/405.2 |
| 5,255,889 | 10/1993 | Collette et al. | 249/102 |
| 5,411,699 | 5/1995 | Collette et al. | 264/523 |
| 5,433,592 | 7/1995 | Marsilio | 425/127 |

* cited by examiner

*Primary Examiner*—Blaine Copenheaver
*Assistant Examiner*—Alicia Chevalier

(57) ABSTRACT

In accordance with the present invention, there is provided a composite forming/curing fixture for fabricating beam members which have a web, at least one outer flange extending from the web and a first web inner radius formed between the web and the outer flange. The fixture is used for forming and curing beam members having a variety of cross-sectional configurations with variable web sizes, flange sizes and first web inner radii. The fixture is provided with a mandrel having opposing first and second mandrel surfaces. The mandrel has first and second positions which facilitate the formation of the various beam sizing and configurations. The fixture is further provided with a web forming space which is adjacent the mandrel for forming the web of the beam member therein. The fixture is further provided with a first and second outer flange forming spaces adjacent the mandrel.

16 Claims, 4 Drawing Sheets

FLEXIBLE COMPOSITE CURE FIXTURE

FIELD OF THE INVENTION

The present invention relates generally to resin composite cure fixtures, and more particularly to fixture having a mandrel which may be alternatively positioned for fabricating resin composite beams having a variety of configurations and sizes.

BACKGROUND OF THE INVENTION

The use of composite material in commercial and military applications is well known. Composite materials are desirable due to their mechanical characteristics such as a high strength to weight ratio and high thermal tolerances. As such, composite materials are used to build structural supports such as beam members.

Various applications such as rockets, launch vehicles, airliners and other vehicles generally characterized by large cylindrical sections, require large structural internal supports. Typically, the cylindrical sections are comprised of an outer skin supported by internal supports which take the form of circular shaped beams. Additionally, circular shaped beams may be used to join multiple cylindrical sections by providing a common internal support to which the outer skins of two cylinders may be attached.

Design requirements for a given launch vehicle type, for example, may provide for cylindrical sections having a generally similar outer skin diameter. Thus, the underlying internal structural supports or beams for various launch vehicles may have roughly the same outer moldline. Due to various considerations (such as loading and weigh), however, the beams are often required to have different cross-sectional configurations and dimensions associated with particular launch vehicles. Thus, generically fabricated beams are typically feasible and specialized tooling is often utilized to make the various beams.

It is therefore evident that there exists a need in the art for tooling for fabricating beams which is flexible so as to facilitate the production of beams having a variety of cross-sectional configurations and dimensions.

SUMMARY OF THE INVENTION

In accordance with the present invention, there is provided a composite forming/curing fixture for fabricating beam members defined by a beam axis of radial symmetry. Each beam member has a web, at least one outer flange extending from the web and a first web inner radius formed between the web and the outer flange. The fixture is used for forming and curing beam members having a variety of cross-sectional configurations with variable web sizes, flange sizes and first web inner radii.

The fixture is provided with a mandrel defined by a mandrel axis of radial symmetry which is co-located with the beam axis of radial symmetry. The mandrel axis is perpendicular to a mandrel plane. The mandrel is disposable in first and second positions with respect to the mandrel plane. The mandrel has opposing first and second mandrel surfaces orthogonal to the mandrel axis of radial symmetry, an annular third mandrel surface extending about the mandrel axis of radial symmetry, a first edge interposed between the first and third mandrel surfaces and defined by a first edge radius and a second edge interposed between the second and third mandrel surfaces defined by a second edge radius. The first mandrel surface is disposed adjacent the mandrel plane while the mandrel is in the first position and the second mandrel surface is disposed adjacent the mandrel plane while the mandrel is in the second position.

The fixture is further provided with a back plate having annular first and second surfaces defined by a back plate axis of radial symmetry which is co-located with the beam axis of radial symmetry. The first and second surfaces are disposable about opposing sides of the mandrel plane. The fixture is further provided with a web forming space for forming the web of the beam member therein. The web forming space is respectively adjacent the first mandrel surface while the mandrel is disposed in the first position and is respectively adjacent the second mandrel surface while the mandrel is disposed in the second position. The fixture is further provided with a first web inner radius forming space for forming the first web inner radius of the beam member therein. The first web inner radius forming space is respectively adjacent the first edge while the mandrel is disposed in the first position and respectively is adjacent the second edge while the mandrel is disposed in the second position. The fixture is further provided with a first outer flange forming space for forming the outer flange therein. The first outer flange forming space is interposed between the third surface of the mandrel and the first surface of the back plate. The fixture is further provided with a second outer flange forming space for forming the outer flange therein. The second outer flange forming space is adjacent to and concentrically within the second surface of the back plate.

The fixture of the present invention is contemplated to be used for forming curved resin composite beam structures. In practice, resin sheets which may be fiber reinforced are applied to the various fixture surfaces. For example, when forming the web of a beam member, the resin sheets are consecutively laid upon the first mandrel surface within the web forming space until a desired web thickness is obtained. Additional resin sheets may be consecutively positioned adjacent the third mandrel surface to a desired thickness. The resin is allowed to cure within the fixture by heating and vacuum-bagged the resin thereon.

In the preferred embodiment of the present invention, the fixture is provided with a base plate formed to support the mandrel and back plate in vacuum-tight engagement thereon. Additionally, a back plate slip sheet may be inserted concentrically between the mandrel and the back plate. In this respect, the outer flange of the beam member is formed between the back plate slip sheet and the mandrel. Similarly, an outer mandrel slip sheet may be inserted concentrically between the mandrel and the back plate. The outer flange of the beam member is formed between the outer mandrel slip sheet and the mandrel.

Further, the mandrel may be formed to have an annular forth mandrel surface and the beam member may be formed to have a first inner flange which is formed adjacent the forth mandrel surface. The fixture may further be provided with an inner mandrel slip sheet which is inserted concentrically within the mandrel adjacent the forth mandrel surface for forming the inner flange thereon.

Additionally, the beam member may be provided with a second inner flange and the fixture may be provided with an annular insert plate for forming the second inner flange thereon. The insert plate has an outer surface which is disposable on an opposing side of the mandrel plane with respect to the mandrel.

As such, based on the foregoing, the present invention mitigates the inefficiencies and limitations associated with prior art fixture. The fixture of the present invention facilitates flexibility of the beam members fabricated. In this respect, beam members may be formed to have a variety of web thicknesses, widths and radii. Advantageously, the fixture of the present invention is contemplated to facilitate the fabrication of beam members having various cross-sectional configurations as provided by the addition of various flanges to a common web. By adding flanges to a common web, a variety of cross-sectional shapes may be readily formed and include those which are, for example, L-shaped, Z-shaped, C-shaped, T-shaped, J-shaped and H- or I-shaped.

Such flexibility is accomplished while utilizing a common mandrel and back plate, which are the largest and heaviest fixture components. In particular, the mandrel is capable of being flipped over or rotated to reveal alternate moldline characteristics. Thus, unlike prior art tooling, the fixture of the present application does not require a specialized mandrel or back plate to be constructed to facilitate the part design flexibility as described above. Flexibility is further enhanced via the usage of the various slip sheets and inserts. The slip sheets and inserts readily accommodate design changes in flange and web positioning, thickness and width.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Figure 1:
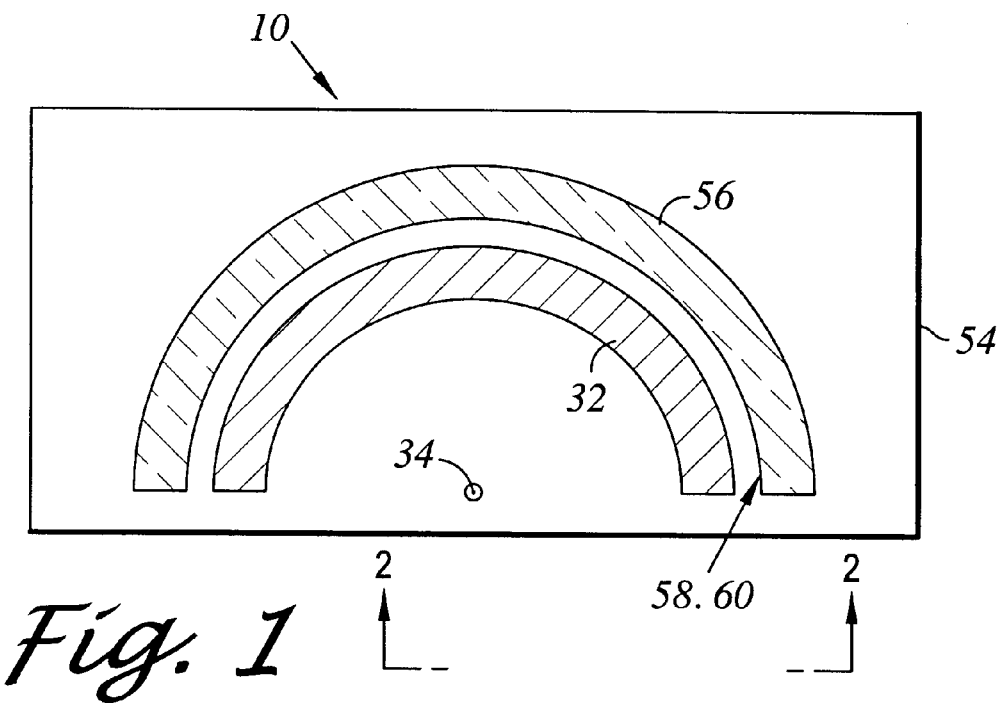
FIG. 1 depicts a top view of the fixture of the present invention.

Referring now to the drawings wherein the showings are for purposes of illustrating a preferred embodiment of the present invention only, and not for purposes of limiting the same, FIGS. 1–11 illustrate a composite forming/curing fixture 10 which is constructed in accordance with the present invention for fabricating curved composite beam members 12.

In accordance with the present invention, there is provided a composite forming/curing fixture 10 for fabricating beam members 12. The fixture is used for forming and curing beam members 12 having a variety of cross-sectional configurations with variable web sizes, flange sizes and first web inner radii. In this regard, it is useful to briefly discuss the general characteristics of the beam members 12 which may be fabricated using the fixture 10 of the present invention. Each beam member 12 is defined by a beam axis of radial symmetry. Each beam member 12 has a web 14 and at least one of a first and second outer flanges 16, 18 extending from the web 14. In addition, the beam member 12 may be provided with first and second inner flanges 20, 22 extending from the web 14. The flanges 16, 18, 20, 22 extend from the web 14 and respectively terminate at flange tips 24, 26, 28, 30. The web 14 and the flanges 16, 18, 20, 22 are each respectively characterized by a width and a thickness.

Figure 3A:
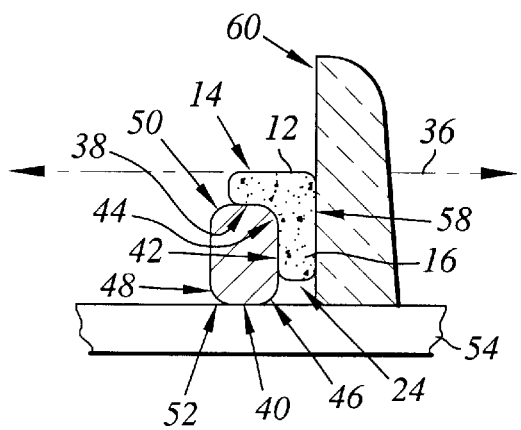
FIG. 3a depicts a cross-sectional view of a portion of the fixture of the present invention as shown with an L-shaped resin material.
Figure 3B:
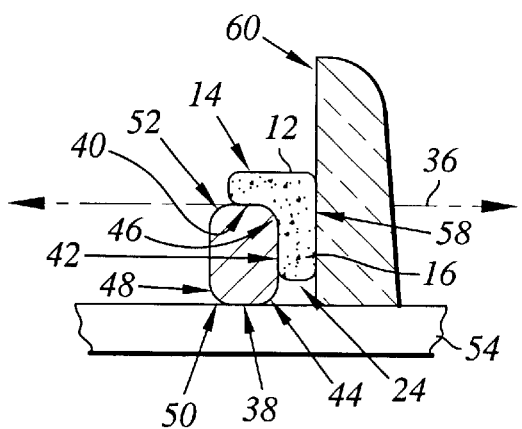
FIG. 3b is substantially the same as FIG. 3a with the exception that the mandrel has been rotated over.
Figure 4:
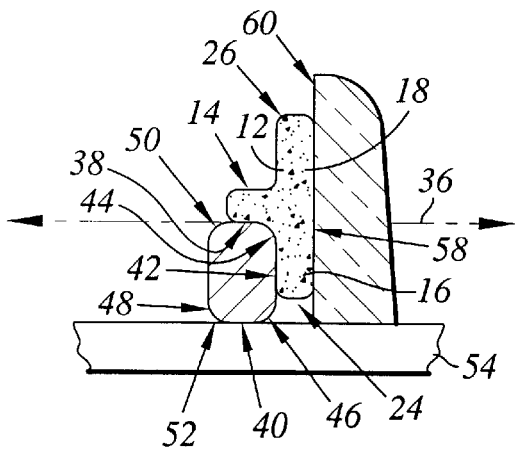
FIG. 4 is substantially the same as FIG. 3a with the exception that the resin material is formed into a T-shape.
Figure 5:
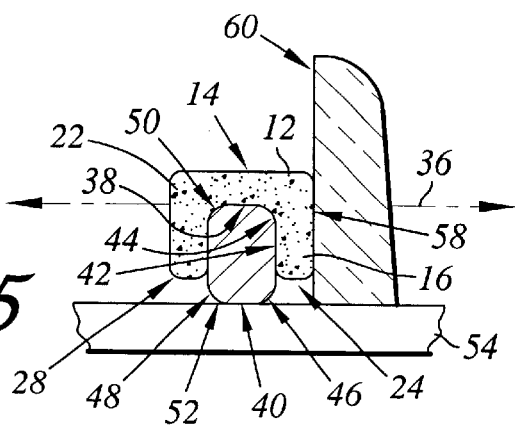
FIG. 5 is substantially the same as FIG. 3a with the exception that the resin material is formed into a C-shape.
Figure 6:
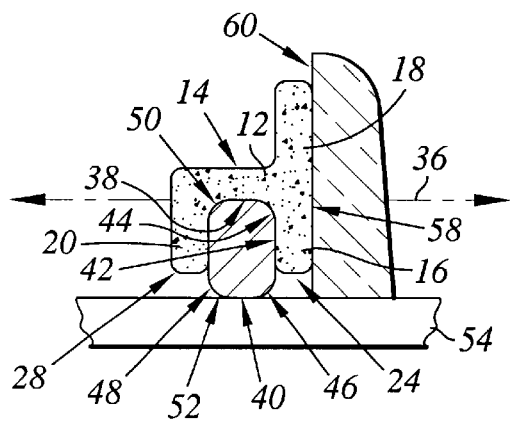
FIG. 6 is substantially the same as FIG. 3a with the exception that the resin material is formed into a J-shape.

It is contemplated that various beam cross-sectional configurations may be accommodated by the addition of the flanges 16, 18, 20, 22 to the common web 14. For example, an L-shaped beam member 14 may be formed via a beam member 12 having the web 14 and the first outer flange 16 (as depicted in FIGS. 3a, 3b, 7, 9 and 10). These L-shaped beam members may be reconfigured to include the second outer flange 18, thus forming a T-shaped beam member 12 (as depicted in FIG. 4). Alternatively, L-shaped beam members may be formed using the configuration shown in FIG. 8. It is contemplated that such use of such a configuration facilitates enhanced control of the various fillet radii. A C-shaped beam member 12 may be formed with the first inner flange 20, the web 14 and the first outer flange 16 (as depicted in FIG. 5). A Z-shaped beam member 12 may be formed with the first inner flange 20, the web 14 and the second outer flange 18 (as depicted in FIG. 8). A J-shaped beam member 12 may be formed with the first inner flange 20, the web 14 and the first and second outer flanges 16, 18 (as depicted in FIG. 6). An I- or H-shaped beam member 12 may be formed with the web 14 and the flanges 16, 18, 20, 22 (as depicted in FIG. 11).

In addition, the intersection between the web 14 and the flanges 16, 18, 20, 22 are defined by various radii thereat. Where there is provided a first outer flange 16, the intersection between the web 14 and the first outer flange 16 is defined by an interior first outer flange radius. Further, where the first outer flange 16 is provided without the second outer flange 18, the intersection between the web 14 and the first outer flange 16 is additionally defined by an exterior first outer flange radius. Where there is provided a first inner flange 20, the intersection between the web 14 and the first inner flange 20 and the web 14 is defined by an interior first inner flange radius. Further, where the first inner flange 20 is provided without the second inner flange 22, the intersection between the web 14 and the first inner flange 20 is additionally defined by an exterior first inner flange radius. Likewise, where there is provided a second outer flange 18, the intersection between the web 14 and the second outer flange 18 is defined by an interior second outer flange radius. Further, where the second outer flange 18 is provided without the first outer flange 16, the intersection between the web 14 and the second outer flange 18 is additionally defined by an exterior second outer flange radius. Where there is provided a second inner flange 22, the intersection between the web 14 and the second inner flange 22 is defined by an interior second flange radius. Further, where the second inner flange 22 is provided without the first inner flange 20, the intersection between the second inner flange 22 is additionally defined by an exterior second flange radius.

Figure 2:
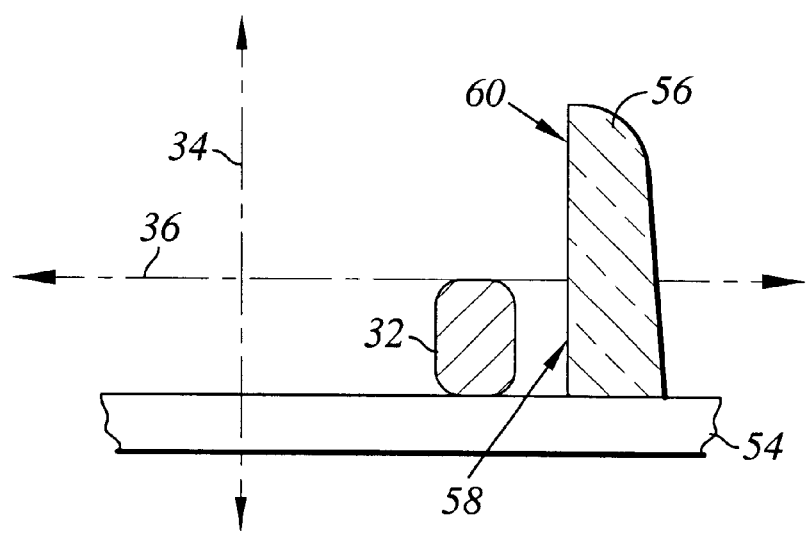
FIG. 2 depicts a cross-sectional view of a portion of the fixture of FIG. 1 as seen along axis 2–2.

Referring now to FIGS. 1 and 2, the fixture 10 is provided with a mandrel 32 which is defined by a mandrel axis 34 of radial symmetry which is co-located with the beam axis of radial symmetry. The mandrel axis 34 is perpendicular to a mandrel plane 36. The mandrel 32 has opposing first and second mandrel surfaces 38, 40 orthogonal to the mandrel axis 34 of radial symmetry. The mandrel 32 is provided with an annular third mandrel surface 42 which is interposed between the first and second mandrel surfaces 38, 40. The third mandrel surface 42 extends about and faces away from the mandrel axis 34 of radial symmetry. Interposed between and joining the first and third mandrel surfaces 38, 42 is a first edge 44. The first edge 44 is defined by a first edge radius. Interposed between and joining the second and third mandrel surfaces 40, 42 is a second edge 46. The second edge 46 is defined by a second edge radius. Preferably, the mandrel 32 is provided with an annular forth mandrel surface 48 which is interposed between the first and second mandrel surface 38, 40 and is concentrically disposed within the third mandrel surface 42. Interposed between and joining the first and forth mandrel surfaces 38, 48 is a third edge 50. The third edge 50 is defined by a first edge radius. Interposed between and joining the second and forth mandrel surfaces 40, 48 is a forth edge 52. The forth edge 52 is defined by a forth edge radius.

The mandrel 32 is disposable in first and second positions with respect to the mandrel plane 36. The first mandrel surface 38 is disposed adjacent the mandrel plane 36 while the mandrel 32 is in the first position and the second mandrel surface 40 is disposed adjacent the mandrel plane 36 while the mandrel 32 is in the second position. In this respect, FIGS. 3a and 3b depict the mandrel 32 in the respective first and second positions.

In the preferred embodiment of the present invention, the fixture 10 is provided with a base plate 54 formed to support the mandrel 32. Thus, when the mandrel 32 is in the first position, the second mandrel surface 40 rests upon the base plate 54. When the mandrel 32 is in the second position, the first mandrel surface 38 rests upon the base plate 54.

The fixture 10 is further provided with a back plate 56 having annular first and second surfaces 58, 60 defined by a back plate axis of radial symmetry which is co-located with the beam axis of radial symmetry. The first and second surfaces 58, 60 are disposable about opposing sides of the mandrel plane 36. Like the mandrel 32, the back plate 56 is supported by the base plate 54. As such, first surface 58 is disposed adjacent the base plate 54 and extends to be adjacent the mandrel plane 36.

The fixture 10 is further provided with a web forming space for forming the web 14 of the beam member 12 therein. The web forming space is adjacent the first mandrel surface 38 while the mandrel 32 is disposed in the first position. The web forming space is adjacent the second mandrel surface 40 while the mandrel 32 is disposed in the second position.

The fixture 10 is further provided with an interior first outer flange radius forming space for forming the interior first outer flange radius of the of the beam member 12 therein. The interior first outer flange radius forming space is respectively adjacent the first edge 44 while the mandrel 32 is disposed in the first position and respectively is adjacent the second edge 46 while the mandrel 32 is disposed in the second position. Thus, when the mandrel 32 is in the first position, the first edge 44 and first edge radius thereof is used to form and define the interior first outer flange radius of the beam member 12. Similarly, when the mandrel 32 is in the second position, the second edge 46 and the second edge radius thereof is used to form and define the interior first outer flange radius of the beam member 12.

The fixture 10 is further provided with a first outer flange forming space for forming the first outer flange 16 therein. The first outer flange forming space is interposed between the third mandrel surface 42 and the first surface 58 of the back plate 56. The fixture 10 is further provided with a second outer flange forming space for forming the second outer flange 18 therein. The second outer flange forming space is adjacent to and concentrically within the second surface 60 of the back plate 56.

In addition, the fixture 10 may be provided with a first inner flange forming space for forming the first inner flange 20 therein (See FIGS. 5, 6, 8, 10 and 11). The first inner flange forming space is adjacent to the forth mandrel surface 48. The fixture 10 is further provided with an interior first inner flange radius forming space for forming the interior first inner flange radius of the of the beam member 12 therein. The interior first inner flange radius forming space is respectively adjacent the third edge 50 while the mandrel 32 is disposed in the first position and respectively is adjacent the forth edge 52 while the mandrel 32 is disposed in the second position. Thus, when the mandrel 32 is in the first position, the third edge 50 and third edge radius thereof is used to form and define the interior first inner flange radius of the beam member 12. Similarly, when the mandrel 32 is in the second position, the forth edge 52 and the forth edge radius thereof is used to form and define the interior first inner flange radius of the beam member 12.

Figure 7:
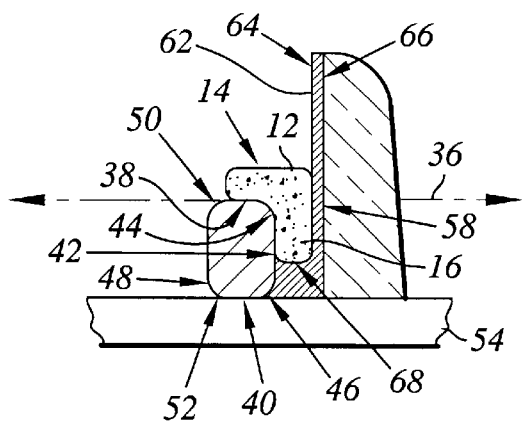
FIG. 7 depicts an alternate embodiment of the present invention which is substantially the same as that shown in FIG. 3a with the exception that a back plate slip sheet is interposed between the mandrel and the back plate.
Figure 8:
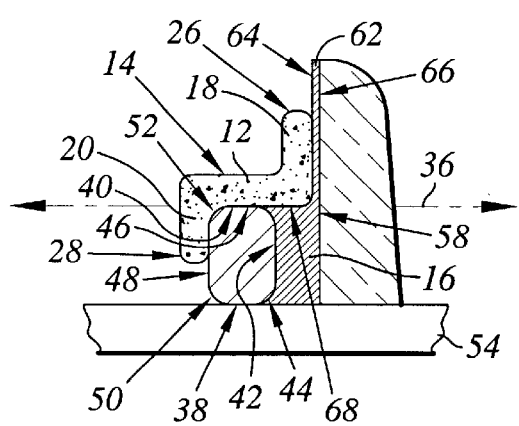
FIG. 8 is substantially the same as FIG. 7 with the exception tha the mandrel has been rated over.

Referring now to FIG. 7, the fixture 10 may be further provided with an annular back plate slip sheet 62. The back plate slip sheet 62 is defined by a back plate slip sheet axis of radial symmetry which is co-located with the beam axis of radial symmetry. The back plate slip sheet 62 has inner and outer surfaces 64, 66. The outer surface 66 formed to radially engage the first surface of the back plate. The inner surface 64 is formed to concentrically receive the mandrel 32 and the first outer flange forming space being interposed between the third mandrel surface 42 and the inner surface 64 of the back plate slip sheet 62. The back plate slip sheet 62 may be further provided with a shoulder portion 68. The inner surface 64 extends through the mandrel plane 36 and terminates at the shoulder portion 68.

In an alternative embodiment, referring now to FIG. 8, the inner surface 64 is formed to be concentrically disposable within the second surface 60 of the back plate 56 and the second outer flange forming space is adjacent to and concentrically within the inner surface 64 and the second surface 60 of the back plate 56. The shoulder portion 68 is disposed adjacent the mandrel plane 36. The shoulder portion 68 is defined by a radius which is used to form the exterior second outer flange radius of the beam member 12 thereat.

Figure 9:
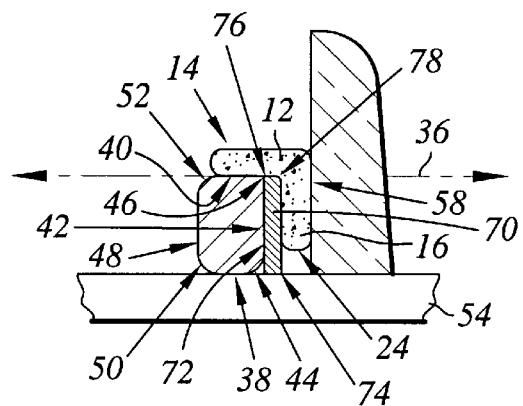
FIG. 9 depicts an alternate embodiment of the present invention which is substantially the same as that shown in FIG. 8 with the exception that an outer mandrel slip sheet.

Referring now to FIG. 9, the fixture 10 may further be provided with an annular outer mandrel slip sheet 70 which is defined by an outer mandrel slip sheet axis of radial symmetry which is co-located with the beam axis of radial symmetry. The outer mandrel slip sheet has an inner surface 72 formed to concentrically receive and engage the third mandrel surface 42. The inner surface 72 extends from the adjacent the base plate 54 and terminates at an inner edge portion 76 adjacent the mandrel plane 36. The inner edge portion 76 is preferably flush with the first edge 44 of the mandrel 32 when the mandrel is in the first position and flush with the second edge 46 of the mandrel 32 when the mandrel is in the second position. In this respect, when the outer mandrel slip sheet 70 is utilized, it is preferable that the respective of either the first or second edges 44, 46 of the mandrel 32 and the inner edge portion 76 of the outer mandrel slip sheet 70 are sufficiently small so as to facilitate such flushness. It is contemplated that have a flush engagement thereat facilitate the smooth and continuous forming of the web 14 of the beam member 12 thereat. The outer mandrel slip sheet 70 has an outer surface 74 which is concentrically received within the first surface 58 of the back plate 56. The first outer flange forming space is interposed between the outer surface 74 of the outer mandrel slip sheet 70 and the first surface 58 of the back plate 56. The outer mandrel slip sheet 70 is further provided with an outer edge portion 78 which is defined by an edge radius. The outer edge portion 78 is used to form and define the interior first outer flange radius thereat. It is contemplated that the outer mandrel slip sheet 70 is used to adjust the width of the web 14 and the thickness and positioning of the first outer flange 16.

Figure 10:
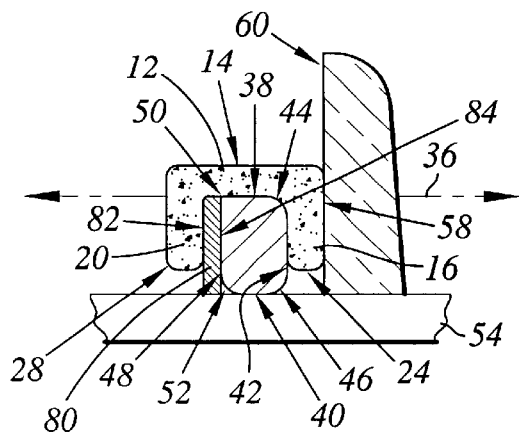
FIG. 10 depicts an alternate embodiment of the present invention as shown with an inner mandrel slip sheet.
Figure 11:
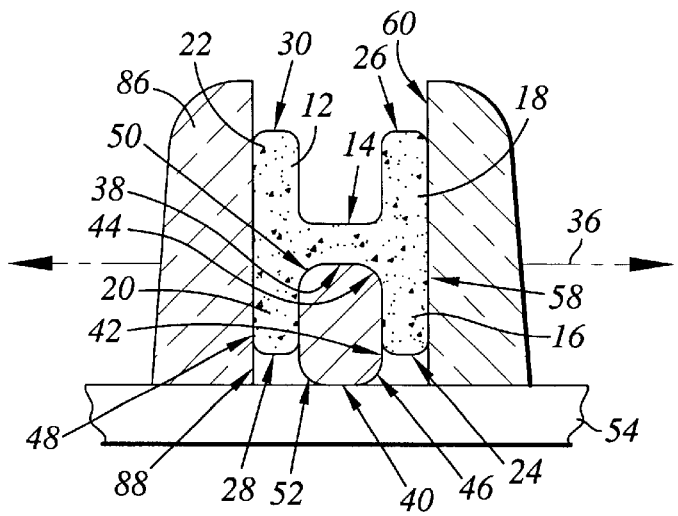
FIG. 11 depicts an alternate embodiment of the present invention as shown with an inner insert plate.

Referring now to FIG. 10, the fixture 10 is further provided with an annular inner mandrel slip sheet 80 which is defined by an inner mandrel slip sheet axis of radial symmetry which is co-located with the beam axis of radial symmetry. The inner mandrel slip sheet 80 has an outer surface 82 which is formed to radially engage the forth mandrel surface 48. The inner mandrel slip sheet 80 further has an inner surface 84 which is concentrically within the outer surface 82. the first inner flange forming space is disposed adjacent the inner surface 84 of the inner mandrel slip sheet 80. The inner mandrel slip sheet 80 is used to adjust the width of the web 14 and the thickness and positioning of the first inner flange 20.

Referring now to FIG. 11, the fixture 10 may be further provided with an inner insert plate 86 which is defined by an insert plate axis of radial symmetry which is co-located with the beam axis of radial symmetry. The inner insert plate 86 has an annular outer surface 88 which is concentrically received within the forth mandrel surface 48. The outer surface 88 extends from adjacent the base plate 54 and through the mandrel plane 36. Thus, the outer surface 88 is disposed about both sides of the mandrel plane 36. The first inner flange forming space is interposed between the outer surface 86 and the forth mandrel surface 48. In particular, where the fixture 10 is provided with the inner mandrel slip sheet 80, the first inner flange forming space is interposed between the outer surface 88 and the inner surface 84 of the inner mandrel slip sheet 80. A second inner flange forming space for forming the second inner flange 22 therein is disposed adjacent to the outer surface 88 at the side of the mandrel plane 36 with respect to the first inner flange forming space.

The fixture of the present invention is contemplated to be used for forming curved resin composite beam members 12. Preferably, the beam members 12 are semi-circular. As such, it is contemplated that the various above described fixture parts, with the exception of the base plate 54, are at least semi-circular.

In practice when using the fixture 10 of the present invention, resin sheets may be consecutively applied to the various fixture surfaces to form a composite beam member 12 having the desired configuration and dimensioning. Typically, the resin sheets take the form of resin backed tape which are provided in rolls. Preferably, the resin sheets are tacky and to some degree self-supporting. Although not necessary, the resin sheet are preferably fiber reinforced or impregnated with fibers. For example, when fabricating the beam member 12, as shown in FIG. 3a, the web 14 is formed by consecutively laying resin sheets upon the first mandrel surface 38 within the web forming space until a desired web thickness is obtained. Additionally, resin sheets are affixed to the third mandrel surface 42 to a thickness approximately equal to the distance between the third mandrel surface 42 and the first surface 58 of the back plate 56 when the mandrel axis 34 and the back plate axis are co-located. The resin sheet may be selectively applied to control any directionality of the reinforcement fibers contained in the resin.

Once the resin sheets are in the desired position, a vacuum may be applied to the resin and fixture 10 in order to density the resin. Such a vacuum may be effectuated according to those methods well known to one of ordinary skill in the art and may include vacuum bagging procedures. As such, it is contemplated that the various engagement surfaces with respect to the back plate 54 are in sealable engagement therewith so as to facilitate a vacuum seal thereat. Further, it is contemplated that the materials and surface characteristics of the above described fixture parts facilitate the initial adhesion of the resin and vacuum bagging procedures. For example, the various above described fixture parts may be formed of metal having smooth surface characteristics. Subsequent to the desification procedure, the resin and the fixture 10 are heated to a desired curing temperature according to those procedures well known to one of ordinary skill in the art. As such, an oven, autoclave, or other desirable heat source may be used to preferably apply heat to the resin sheet lay-up uniformly. Subsequent to curing, the mandrel 32 may be moved away from the back plate 56 to reveal a cured resin composite beam member 12.

As one of ordinary skill in the art will appreciate, the web width of the beam member 12 can be increased through the utilization of the back plate slip sheet 62, outer mandrel slip sheet 70 and the inner mandrel slip sheet 80. In addition, the mandrel 32 may be reconfigured from its first position to its second position for faciliate desired changes in web radius and flange configuration. Furthermore, the back plate slip sheet 62, outer mandrel slip sheet 70 and the inner mandrel slip sheet 80 may be utilized to adjust the configuration, positioning, thickness and width of the flanges 16, 18, 20, 22.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A composite forming/curing fixture for fabricating beam members defined by a beam axis of radial symmetry, each beam member having a web, at least one outer flange extending from the web and a first web inner radius formed between the web and the outer flange, the fixture being used for forming and curing beam members having a variety of cross-sectional configurations with variable web sizes, flange sizes and first web inner radii, the fixture comprising:

a mandrel defined by a mandrel axis of radial symmetry which is co-located with the beam axis of radial symmetry, the mandrel axis is perpendicular to a mandrel plane, the mandrel being disposable in first and second positions with respect to the mandrel plane, the mandrel having:

opposing first and second mandrel surfaces orthogonal to the mandrel axis of radial symmetry;

an annular third mandrel surface extending about the mandrel axis of radial symmetry;

a first edge interposed between the first and third mandrel surfaces and defined by a first edge radius; and a second edge interposed between the second and third mandrel surfaces defined by a second edge radius;

wherein the first mandrel surface is disposed adjacent the mandrel plane while the mandrel is in the first position, the second mandrel surface is disposed adjacent the mandrel plane while the mandrel is in the second position;

a back plate disposed radially about the mandrel, the back plate having annular first and second surfaces defined by a back plate axis of radial symmetry which is co-located with the beam axis of radial symmetry, the first and second surfaces being disposable about opposing sides of the mandrel plane, the first surface being disposable opposite the third mandrel surface;

a web forming space for forming the web of the beam member therein, the web forming space is respectively adjacent the first mandrel surface while the mandrel is disposed in the first position and is respectively adjacent the second mandrel surface while the mandrel is disposed in the second position;

a first web inner radius forming space for forming the first web inner radius of the beam member therein, the first web inner radius forming space is respectively adjacent the first edge while the mandrel is disposed in the first position and respectively is adjacent the second edge while the mandrel is disposed in the second position;

a first outer flange forming space for forming the outer flange therein, the first outer flange forming space being interposed between the third mandrel surface and the first surface of the back plate; and a second outer flange forming space for forming the outer flange therein, the second outer flange forming space being adjacent to and concentrically within the second surface of the back plate.

2. The composite forming/curing fixture of claim 1 wherein the first and second edge radii are different.

3. The composite forming/curing fixture of claim 1 further comprises:

an annular back plate slip sheet defined by a back plate slip sheet axis of radial symmetry which is co-located with the beam axis of radial symmetry, the back plate slip sheet having an inner surface formed to concentrically receive the mandrel and an outer surface formed to radially engage the first surface of the back plate; and wherein the first outer flange forming space being interposed between the third mandrel surface and the inner surface of the back plate slip sheet.

4. The composite forming/curing fixture of claim 3 wherein the inner surface of the back plate slip sheet is formed to be concentrically disposable within the second surface of the back plate and the outer surface of the back plate slip sheet is formed to engage the second surface of the back plate, the second outer flange forming space being adjacent to and concentrically within the inner surface of the back plate slip plate and the second surface of the back plate.

5. The composite forming/curing fixture of claim 3 wherein the at least one outer flange of the beam member having an annular flange tip, the inner surface of the back plate slip sheet having an annular shoulder portion formed therein, the back plate slip sheet being concentrically disposable within the first surface of the back plate, the fixture further comprises:

a flange tip forming space for forming the flange tip of the at least one outer flange of the beam member, the flange tip forming space being adjacent the shoulder portion.

6. The composite forming/curing fixture of claim 1 further comprises:

an annular back plate slip sheet defined by an back plate slip sheet axis of radial symmetry which is co-located with the beam axis of radial symmetry, the back plate slip sheet having an inner surface formed to be concentrically disposable within the second surface of the back plate and an outer surface formed to engage the second surface of the back plate; and wherein the second outer flange forming space being adjacent to and concentrically within the inner surface of the back plate slip plate.

7. The composite forming/curing fixture of claim 6 wherein the beam member further having a web outer radius formed between the web and the outer flange and the at least one outer flange being formed within the second outer flange forming space, and wherein the inner surface of the back plate slip sheet having an annular shoulder portion formed therein, the back plate slip sheet being disposable adjacent the mandrel plane and defined by a shoulder radius, the fixture further comprises:

a web outer radius forming space for forming the web outer radius of the beam member therein, the web outer radius forming space is adjacent the shoulder portion.

8. The composite forming/curing fixture of claim 1 wherein the beam member further having a first inner flange and the mandrel further having an annular forth mandrel surface extending about the mandrel axis of radial symmetry concentrically within the third mandrel surface, the fixture further comprises:

a first inner flange forming space for forming the first inner flange therein, the first inner flange forming space is adjacent to the forth mandrel surface.

9. The composite forming/curing fixture of claim 8 wherein the mandrel further having a third edge interposed between the first and forth mandrel surfaces and defined by a third edge radius, the mandrel further having a forth edge interposed between the second and forth mandrel surfaces and defined by a forth edge radius, the fixture further comprises:

a second web inner radius forming space for forming the second web inner radius of the beam member therein, the second web inner radius forming space is respectively adjacent the third edge while the mandrel is disposed in the first position and is respectively adjacent the forth edge while the mandrel is disposed in the second position.

10. The composite forming/curing fixture of claim 9 wherein the third and forth edge radii are different.

11. The composite forming/curing fixture of claim 8 wherein the fixture further comprises:

an annular inner mandrel slip sheet defined by an inner mandrel slip sheet axis of radial symmetry which is co-located with the beam axis of radial symmetry, the inner mandrel slip sheet having an outer surface formed to radially engage the forth mandrel surface and an inner surface concentrically within the outer surface of the inner mandrel slip sheet, wherein the first inner flange forming space is disposed adjacent the inner surface of the inner mandrel slip sheet.

12. The composite forming/curing fixture of claim 8 wherein the beam member further having a second inner flange, the fixture further comprises:

an inner insert plate defined by an insert plate axis of radial symmetry which is co-located with the beam axis of radial symmetry and has an annular outer surface which concentrically received by the forth mandrel surface, the annular outer surface being disposable on an opposing side of the mandrel plane with respect to the mandrel, the mandrel being positioned radially between the inner insert plate and the back plate; and a second inner flange forming space for forming the second inner flange therein, the second inner flange forming space is adjacent to the outer surface of the inner insert plate.

13. The composite forming/curing fixture of claim 1 wherein the fixture further comprises a base plate formed to support the mandrel and back plate in vacuum-tight engagement thereon.

14. The composite forming/curing fixture of claim 13 wherein the base plate engages the second surface of the mandrel when the mandrel is in the first position and engages the first surface of the mandrel when the mandrel is in the second position.

15. The composite forming/curing fixture of claim 1 wherein the fixture further comprises:

an annular outer mandrel slip sheet defined by an outer mandrel slip sheet axis of radial symmetry which is co-located with the beam axis of radial symmetry, the outer mandrel slip sheet having an inner surface formed to concentrically receive and engage the third mandrel surface and an outer surface concentrically received by the first surface of the back plate; and wherein the first outer flange forming space being interposed between the outer surface of the outer mandrel slip sheet and the first surface of the back plate.

16. The composite forming/curing fixture of claim 1 wherein the mandrel and back plate are semi-circular.

* * * * *